United States Patent
Diehl et al.

(10) Patent No.: US 8,380,996 B2
(45) Date of Patent: Feb. 19, 2013

(54) COPY-PROTECTED SOFTWARE CARTRIDGE

(75) Inventors: Eric Diehl, Cesson Sevigne Cedex (FR); Marc Eluard, Cesson Sevigne Cedex (FR); Nicolas Prigent, Rennes (FR)

(73) Assignee: Thomson Licensing (FR)

( * ) Notice: Subject to any disclaimer, the term of this patent is extended or adjusted under 35 U.S.C. 154(b) by 187 days.

(21) Appl. No.: 12/735,422

(22) PCT Filed: Jan. 30, 2009

(86) PCT No.: PCT/EP2009/051098
§ 371 (c)(1),
(2), (4) Date: Jan. 14, 2011

(87) PCT Pub. No.: WO2009/095493
PCT Pub. Date: Aug. 6, 2009

(65) Prior Publication Data
US 2011/0119503 A1    May 19, 2011

(30) Foreign Application Priority Data

Feb. 1, 2008    (EP) ..................................... 08300069
Mar. 4, 2008    (EP) ..................................... 08300133

(51) Int. Cl.
*G06F 11/30*    (2006.01)
(52) U.S. Cl. .......................... 713/193; 713/192; 713/189
(58) Field of Classification Search ........................ None
See application file for complete search history.

(56) References Cited

U.S. PATENT DOCUMENTS

| | | | | |
|---|---|---|---|---|
| 4,607,347 A | * | 8/1986 | Kummer et al. ................. | 712/38 |
| 4,817,140 A | * | 3/1989 | Chandra et al. ............... | 380/277 |
| 6,751,731 B1 | * | 6/2004 | Binding et al. ............... | 713/171 |
| 7,350,081 B1 | * | 3/2008 | Best .............................. | 713/190 |
| 2002/0066021 A1 | * | 5/2002 | Chien et al. ................... | 713/200 |
| 2002/0092003 A1 | * | 7/2002 | Calder et al. .................. | 717/138 |
| 2003/0112972 A1 | | 6/2003 | Hattick et al. | |
| 2005/0063540 A1 | | 3/2005 | Hsiung | |
| 2006/0015752 A1 | | 1/2006 | Krueger | |
| 2007/0194889 A1 | | 8/2007 | Bailey et al. | |
| 2008/0012690 A1 | | 1/2008 | Friedrich | |
| 2011/0314288 A1 | * | 12/2011 | Yogev ........................... | 713/172 |
| 2012/0019840 A1 | * | 1/2012 | Edwards et al. ............... | 358/1.6 |
| 2012/0036245 A1 | * | 2/2012 | Dare et al. ..................... | 709/223 |

FOREIGN PATENT DOCUMENTS

GB    2434896    8/2007
WO    WO2006131861    12/2006

* cited by examiner

*Primary Examiner* — David Y Jung
(74) *Attorney, Agent, or Firm* — Jack Schwartz and Associates, PLLC

(57) ABSTRACT

A cartridge preferably for use with a game console. The cartridge comprises a ROM, a non-volatile memory, a processor and an encryption unit. An application running on the console may read data from the ROM, read data from the non-volatile memory, and write data in the non-volatile memory. Data to be written in the non-volatile memory is encrypted by the encryption unit, but data to be read is returned in encrypted form for decryption by a decryption function of the game application. Data may also be received encrypted to be decrypted and returned. The encryption or decryption unit may also receive data from the non-volatile memory and send it to the interface. The invention improves on the prior art copy protection as a hacker must reverse engineer the game application in order to copy it, if the encryption unit is unknown. The invention also provides an optical medium equipped with a RFID circuit.

9 Claims, 2 Drawing Sheets

COPY-PROTECTED SOFTWARE CARTRIDGE

This application claims the benefit, under 35 U.S.C. §365 of International Application PCT/EP2009/051098, filed Jan. 30, 2009, which was published in accordance with PCT Article 21(2) on Aug. 6, 2009 in English and which claims the benefit of European patent application No. 08300069.5, filed Feb. 1, 2008 and European patent application No. 08300133.9, filed Mar. 4, 2008.

FIELD OF THE INVENTION

The present invention relates generally to computer software, and in particular to copy protection for software on cartridges.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer programs, and in particular computer games (which will hereinafter be used as a non-limitative example), have long been stored on so called cartridges for ease of use, other advantages being instant access to the software and the robustness of the package. Such cartridges typically comprise an interface for interaction with a console, a ROM that stores the software application, and a further memory, preferably non-volatile, for storing game parameters.

However, software on these cartridges is almost as vulnerable to copying as 'normal' software. Naturally, software providers have come up with defences against copying, such as the use of dedicated interfaces and chipsets, and encryption of the software application. Unfortunately, hackers have been able to crack the prior art defences and practically all current programs may be found on the Internet, e.g. on sites dedicated to hacking.

European patent application EP 07300965 teaches a system for protection of pre-recorded media. The media is associated with a secure processor that stores information and software that a player needs in order to fully access the content. Whenever the player needs this information or the result of the software, it contacts the secure processor and waits for the response. A disadvantage with this solution is that players that are not adapted to interact with the secure processor are unable to use the content.

It can therefore be appreciated that there is a need for a solution that improves copy protection of software on cartridges, preferably enabling the continued use of existing consoles. This invention provides such a solution.

SUMMARY OF THE INVENTION

In a first aspect, the invention is directed to a copy-protected storage support adapted for use with a console. The storage support comprises a memory adapted to store application parameter data; a data storage area adapted to store at least parts of an application executable on the console; and an interface adapted to send application data read from the data storage area to the console via an interface of the console, read application parameter data from the memory and communicate, via the interface of the console, the read application parameter data to the application executed on the console. The storage support further comprises a cryptographic unit adapted to receive application parameter data from the interface, perform a cryptographic operation on the received application parameter data, and store the received application parameter data in the memory. The interface is further adapted either to receive application parameter data in encrypted form from the application executed on the console and to return application parameter data in unencrypted form to the application executed on the console, or to receive application parameter data in unencrypted form from the application executed on the console and to return application parameter data in encrypted form to the application executed on the console.

In a second aspect, the invention is directed to a copy-protected storage support adapted for use with a console. The storage support comprises a memory adapted to store application parameter data; a data storage area adapted to store at least parts of an application executable on the console; and an interface adapted to send application data read from the data storage area to the console via an interface of the console, receive, via the interface of the console, application parameter data from the application executed on the console and store received application parameter data in the memory. The storage support further comprises a cryptographic unit adapted to receive application parameter data from the memory, perform a cryptographic operation on the received application parameter data, and send the received application parameter data to the interface. The interface is further adapted either to receive application parameter data in encrypted form from the application executed on the console and to return application parameter data in unencrypted form to the application executed on the console, or to receive application parameter data in unencrypted form from the application executed on the console and to return application parameter data in encrypted form to the application executed on the console.

In first preferred embodiments, the cryptographic operation is decryption of the data, and the interface is adapted to receive the data in encrypted form from the console and to return the data in unencrypted form to the console.

In second preferred embodiments, the cryptographic operation is encryption of the data, and the interface is adapted to receive the data in unencrypted form from the console and to return the data in encrypted form to the console.

In third preferred embodiments, the storage support is a cartridge and the data storage area is a memory.

In fourth preferred embodiments, the storage support is an optical storage medium embodying the data storage area. The optical storage medium is equipped with a RFID circuit that embodies the interface, the memory and the encryption unit.

In fifth preferred embodiments, the algorithm used to encrypt the data is based on asymmetrical cryptography.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

Figure 1:
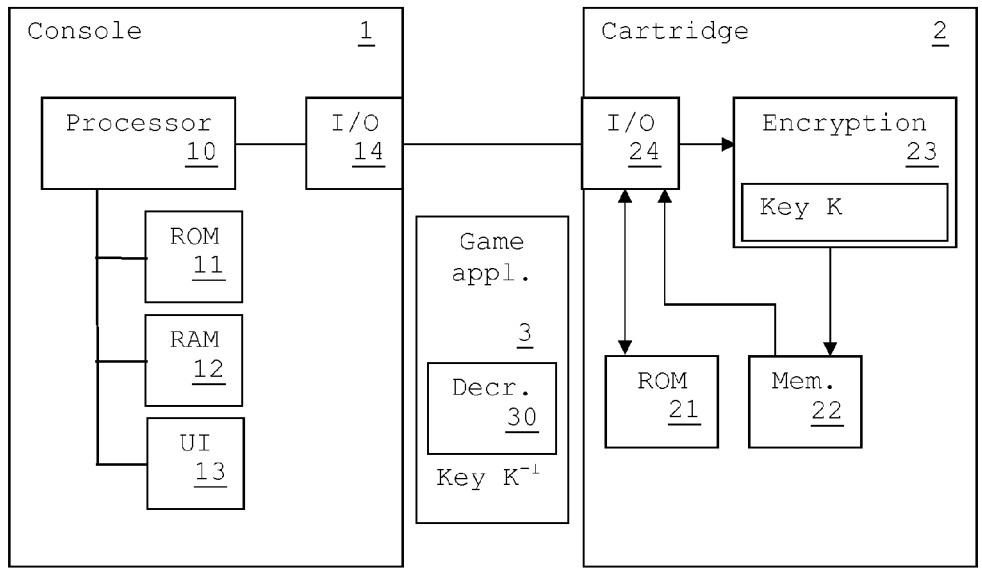
FIG. 1 illustrates a console with a cartridge according to a preferred embodiment of the invention.

FIG. 1 illustrates a console 1 with a cartridge 2 according to a preferred embodiment of the invention. In the description, the term "console" is used to denote a device that is able to interact with a cartridge so as to execute an application stored on it, and the term "cartridge" is used to denote a physical object using solid state memory to store the application. The cartridge 2 may advantageously be releasably connected to the console 1.

The console comprises one or more processors (hereinafter "processor") 10 for execution of software applications and an interface manager 14, that implements a physical and logical interface, for interaction with the cartridge 2. The interface 14 may be through a typical address/data bidirectional bus or through calls to one or more functions.

The console further comprises read-only memory (ROM) 11 storing at least one application, firmware, and middleware; random access memory (RAM) 12 storing temporary data and a game application 3 loaded from the cartridge 2; a user interface 13 for interaction with one or more users through e.g. screen and loudspeakers, and key, buttons, and touch screens. The processor 10 is adapted to execute the at least one application in the ROM and the game application 3 stored in the RAM 12.

The interface 14 preferably detects the presence of the cartridge 2 automatically. Typically, when the cartridge 2 is not present, the bus is not powered, and no power is supplied. As soon as the cartridge 2 is present, the power is supplied to the cartridge 2, and the data bus is also powered. The power supply is not illustrated as it is beyond the scope of this invention.

The cartridge 2 comprises an interface 24 adapted to communicate with the interface 14 of the console 1. The cartridge further comprises a ROM 21 that stores the game application at a fixed address (such as 0x00000) and at least one non-volatile memory (hereinafter "non-volatile memory") 22 adapted to store e.g. game parameters such as the players current position in the game. The non-volatile memory 22 may for example be an Electrical Erasable PROgrammable Memory (EEPROM) or a Flash memory. The cartridge 2 also comprises an encryption unit 23 that, preferably securely, stores an encryption key K. It should be noted that the key K may also be stored elsewhere in the cartridge 2.

In a preferred embodiment, the encryption unit 23 is a hardware RSA scrambler with an embedded 1024-bit private key as encryption key K. The encryption key K may be the same for all cartridges 2 for the same game application 3, but it is also possible to use different encryption keys K between batches of cartridges 2 or indeed individual cartridges 2.

The ROM 21, the non-volatile memory 22, the encryption unit 23, and the interface 24 may be implemented in a single chip, such as a system on chip (SOC) or as two or more separate circuits.

The game application 3 is a virtual entity used to clarify the invention. The game application may be said to be the software program from at least the ROM 21 (parts of the game application 3 may be received from other sources, such as e.g. over the Internet) as executed by the processor 10. The game application 3 may further be said to be aware of the internal organization of the cartridge 2. When it is executed by the processor 10, the game application 3 may communicate, via the interfaces 14 and 24, with the cartridge 2 in order to perform at least one action, such as: read data from the ROM 21; read data from the non-volatile memory 22; and write data in the non-volatile memory 22. When data is to be written in the non-volatile memory 22, the interface 24 forwards the data to the encryption unit 23 for encryption with key K and storage. It should be noted that the encryption unit stores the data either directly (i.e. by writing in the non-volatile memory 22) or indirectly (i.e. by passing the data to an intermediate unit). However, when data is to be read from the non-volatile memory 22, the interface 24 reads the data from the non-volatile memory 22 and forwards the data in encrypted form to the game application 3. The skilled person will appreciate that the encryption unit does not decrypt stored data, and that data thus is received by the cartridge "in the clear" and sent from the cartridge in encrypted form.

The game application 3 comprises a decryption function 30 and a decryption key $K^{-1}$ that corresponds to the encryption key K. In case asymmetrical cryptography is used, there is no need to "hide" the decryption key $K^{-1}$ within the game application 3. However, if symmetrical cryptography is used, then the decryption key $K^{-1}$ should be hidden somehow, for example by using so-called "white-box cryptography". As described hereinbefore, the game application may communicate with the cartridge 2 in order to: read data from the ROM 21, write data in the non-volatile memory 22, and read data from the non-volatile memory 22. Data to be written in the non-volatile memory 22 is sent "in the clear," or possibly encrypted using a session key that protects data sent between the interfaces 14, 24, to be encrypted and stored. Data read from the non-volatile memory 22 is received in encrypted form and decrypted by the decryption function 30 using the decryption key $K^{-1}$.

In a preferred embodiment, the decryption routine 30 of the game application 3 implements an RSA descrambler and the decryption key $K^{-1}$ is the public key corresponding to private encryption key K.

The invention can thus combat easy hacking and copying of the game, as the assumption is that the hacker never has access to key K used by the encryption unit 23. If this is true, the hacker cannot duplicate the cartridge 2 without modifying the game application 3.

Figure 2:
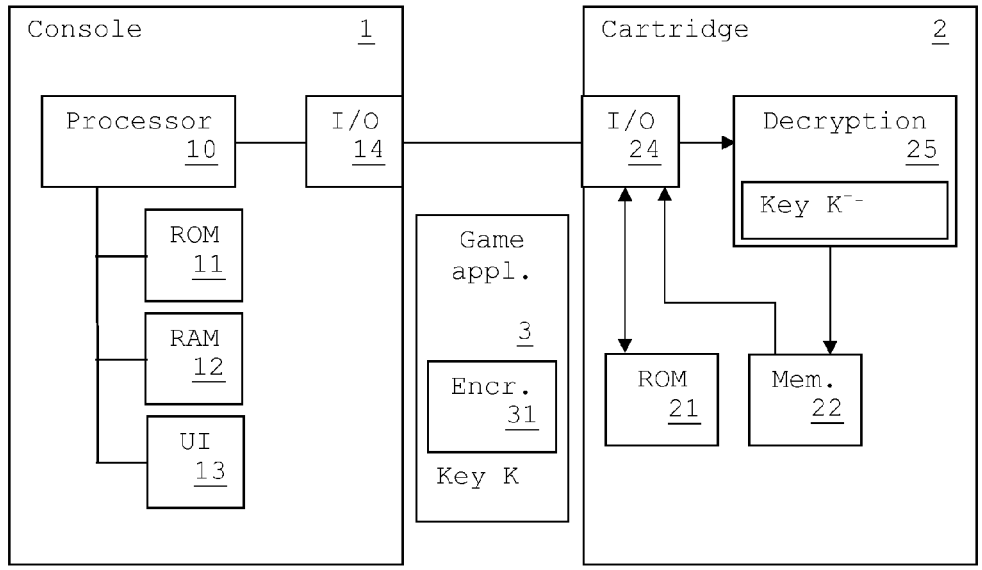
FIG. 2 illustrates a console with a cartridge according to an alternative embodiment of the invention.

FIG. 2 illustrates a console with a cartridge according to an alternative embodiment of the invention. In this embodiment, the console 1 may be identical to the console of the preferred embodiment. The cartridge 2 comprises an interface 24, a ROM 21, a non-volatile memory 22, and a decryption unit 25. The game application 3 comprises an encryption function 31.

A main difference between the alternative embodiment and the preferred embodiment is that the game application 3 here is adapted to encrypt data, using key K, for storage in the non-volatile memory 22 of the cartridge. The encrypted data is received by the interface 24, forwarded to the decryption unit 25 that decrypts the data using key $K^{-1}$ and sends the decrypted data to the non-volatile memory 22 for storage. When the game application 3 then requests the data, the interface 24 retrieves the unencrypted data from the non-volatile memory 22 and sends it to the console 1.

It will be appreciated that a variant is possible in both embodiments. The encryption unit 23 and the decryption unit 25 may be located "on the other side" of the non-volatile memory 22. For example, in the preferred embodiment, the data is stored unencrypted in the non-volatile memory 22 and encrypted by the encryption unit 23 when the data is requested by the game application 3.

Figure 3:
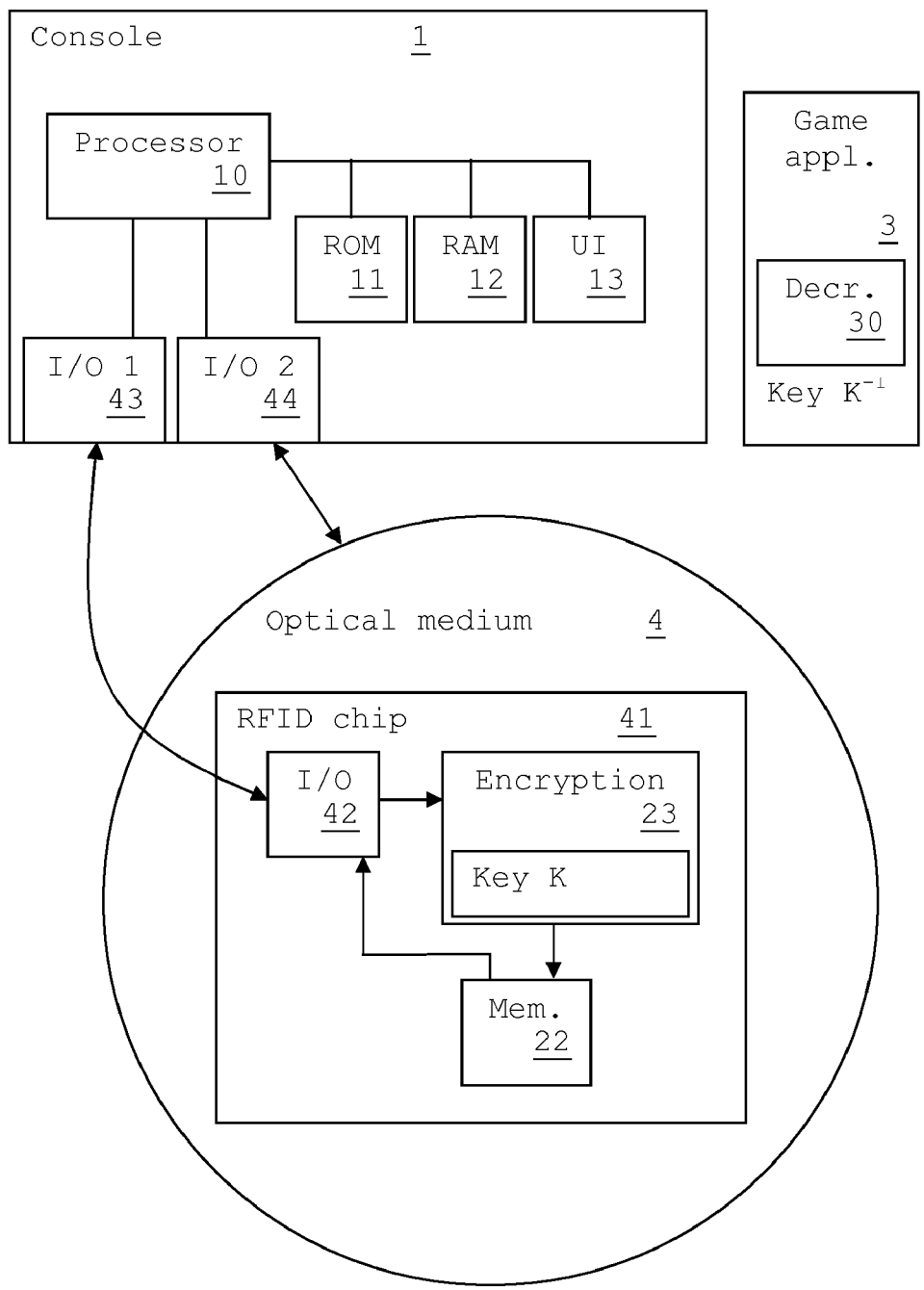
FIG. 3 illustrates a console with an optical medium according to a variant embodiment of the invention.

FIG. 3 illustrates a console 1 with an optical medium 4 according to a variant embodiment of the invention. The variant embodiment resembles the preferred embodiment quite a bit—one difference being that the static storage medium is an optical medium and not a read-only memory—and description of similar features may thus be shortened. The optical medium 4, for example a CD-ROM or a DVD, is equipped with a RFID (Radio Frequency Identification) circuit 41 that comprises an interface 42, a non-volatile memory 22, and an encryption unit 23 storing an encryption key K. The console 1 comprises a first interface 43 for interaction with the RFID circuit 41 and a second interface 44 for interaction with the optical medium 4. It is possible that the two interfaces are embodied as a single component.

The game application 3, as executed by the processor 10 may perform at least three actions concerning the optical medium 4: through the second interface 44, it may read data from the optical medium 4 as such (corresponds roughly to the ROM in the preferred embodiment); and through the first interface 43 it may read data from and write data to the non-volatile memory 22 in the RFID circuit 41. As in the preferred embodiment, data to be written in the non-volatile memory 22 is preferably sent "in the clear" and encrypted by the encryption unit 23, while data read from the non-volatile memory 22 is read "as is" and returned in an encrypted form for decryption by the decryption unit 30 of the game application 3.

An advantage of the invention is that it can enable old consoles to use new, protected cartridges without modification to the former, as the consoles need no knowledge of the architecture of a cartridge.

It will thus be appreciated that the present invention provides an improved software copy protection system. The person skilled in the art will appreciate that it is not limited to games.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections. Only feature relevant to the invention have been described; features not necessary for the description of the invention have been left out intentionally to facilitate understanding.

Reference numerals appearing in the claims are by way of illustration only and shall have no limiting effect on the scope of the claims.

The invention claimed is:

1. A copy-protected storage support configured for use with a console, the storage support comprising:
   a data storage area configured to store at least parts of an application executable on the console; and
   an interface configured to:
      send application data read from the data storage area to the console via an interface of the console;
   wherein the storage support further comprises:
      a memory configured for storage of application parameter data received by the interface from the application executed on the console;
      a cryptographic unit configured to receive application parameter data from the interface, perform a cryptographic operation on the received application parameter data, and store the received application parameter data in the memory;
   wherein the interface is further configured to:
      read application parameter data from the memory;
      communicate, via the interface of the console, the read application parameter data to the application executed on the console; and
      the interface either receiving application parameter data in encrypted form from the application executed on the console and returning application parameter data in unencrypted form to the application executed on the console, or receiving application parameter data in unencrypted form from the application executed on the console and returning application parameter data in encrypted form to the application executed on the console.

2. A copy-protected storage support configured for use with a console, the storage support comprising:
   a data storage area configured to store at least parts of an application executable on the console; and
   an interface configured to:
      send application data read from the data storage area to the console via an interface of the console;
   wherein the storage support further comprises:
      a memory configured for storage of application parameter data received by the interface from the application executed on the console;
      a cryptographic unit configured to receive application parameter data from the memory, perform a cryptographic operation on the received application parameter data, and send the received application parameter data to the interface;
   wherein the interface is further configured to:
      receive, via the interface of the console, application parameter data from the application executed on the console; and
      store the received application parameter data in the memory; and
      the interface either receiving application parameter data in encrypted form from the application executed on the console and returning application parameter data in unencrypted form to the application executed on the console, or receiving application parameter data in unencrypted form from the application executed on the console and returning application parameter data in encrypted form to the application executed on the console.

3. The storage support of claim 1, wherein the cryptographic operation is decryption of the data, and wherein the interface is adapted to receive the data in encrypted form from the console and to return the data in unencrypted form to the console.

4. The storage support of claim 1, wherein the cryptographic operation is encryption of the data, and wherein the interface is adapted to receive the data in unencrypted form from the console and to return the data in encrypted form to the console.

5. The storage support of claim 1, wherein the storage support is a cartridge and the data storage area is a memory.

6. The storage support of claim 1, wherein the storage support is an optical storage medium embodying the data storage area, the optical storage medium being equipped with a RFID circuit that embodies the interface, the memory and the encryption unit.

7. The storage support of claim 1, wherein the algorithm used to encrypt the data is based on asymmetrical cryptography.

8. The storage support of claim 1, wherein the at least parts of the application executable on the console comprises either an encryption key for encrypting the application parameter data to be sent to the interface or a decryption key for decrypting the encrypted application parameter data received from the interface.

9. The storage support of claim 2, wherein the at least parts of the application executable on the console comprises either an encryption key for encrypting the application parameter data to be sent to the interface or a decryption key for decrypting the encrypted application parameter data received from the interface.

* * * * *